(12) United States Patent
Cohen et al.

(10) Patent No.: US 6,573,830 B2
(45) Date of Patent: Jun. 3, 2003

(54) PROGRESSIVE BRAKE LIGHT SYSTEM

(75) Inventors: Saul Lawrence Cohen, Johannesburg (ZA); Gary Nathan Kessel, Johannesburg (ZA); Larry Rubin Gordon, Johannesburg (ZA)

(73) Assignee: Intellibrake (Proprietary) Limited, Sandown (ZA)

( * ) Notice: Subject to any disclaimer, the term of this patent is extended or adjusted under 35 U.S.C. 154(b) by 0 days.

(21) Appl. No.: 09/928,160

(22) Filed: Aug. 10, 2001

(65) Prior Publication Data

US 2001/0054957 A1 Dec. 27, 2001

Related U.S. Application Data

(63) Continuation-in-part of application No. PCT/GB99/00431, filed on Feb. 11, 1999.

(51) Int. Cl.[7] ................................................. B60Q 1/44
(52) U.S. Cl. ...................... 340/479; 340/463; 340/464; 340/467; 340/468
(58) Field of Search ............................... 340/479, 468, 340/463, 464, 466, 467, 472, 903

(56) References Cited

U.S. PATENT DOCUMENTS

| | | | | |
|---|---|---|---|---|
| 4,320,384 A | * | 3/1982 | Carlson | 340/467 |
| 4,983,953 A | | 1/1991 | Page | 340/467 |
| 5,150,098 A | | 9/1992 | Rakow | 340/479 |
| 5,217,280 A | * | 6/1993 | Nykerk et al. | 303/3 |
| 5,298,882 A | * | 3/1994 | Tsai | 340/468 |
| 5,352,028 A | * | 10/1994 | Eccleston | 303/20 |
| 5,594,415 A | | 1/1997 | Ishikawa et al. | 340/467 |
| 5,805,060 A | * | 9/1998 | Schroeder | 340/467 |
| 5,821,851 A | * | 10/1998 | Blackmer | 340/467 |
| 5,828,319 A | * | 10/1998 | Tonkin et al. | 340/903 |
| 5,831,523 A | * | 11/1998 | Lange | 340/479 |
| 5,838,259 A | * | 11/1998 | Tonkin | 340/903 |
| 5,856,793 A | * | 1/1999 | Tonkin et al. | 340/903 |
| 6,133,852 A | * | 10/2000 | Tonkin | 340/903 |
| 6,163,256 A | * | 12/2000 | Brown | 340/479 |
| 6,268,792 B1 | * | 7/2001 | Newton | 340/467 |

FOREIGN PATENT DOCUMENTS

| | | |
|---|---|---|
| FR | 2537066 | 6/1984 |
| FR | 2742108 | 6/1997 |

* cited by examiner

*Primary Examiner*—Toan Pham
(74) *Attorney, Agent, or Firm*—Dean W. Russell; Kilpatrick Stockton LLP

(57) ABSTRACT

The progressive vehicle brake light system of the invention consists of a brake sensor arranged to sense the travel of a brake pedal and a brake light display arranged to illuminate or extinguish in sequence or progressively in response to the travel of the brake pedal. A microcontroller is provided for receiving a signal from the brake sensor and controlling the brake light display accordingly. The brake sensor is typically an optical sensor utilizing infrared transmitters and receivers arranged to sense the distance and direction of travel of the brake pedal. The brake light display consists of a row of light emitting diodes (LEDs) which are arranged to illuminate from the opposite ends towards the middle as the brake pedal is depressed and to extinguish in reverse sequence when the brake pedal is released.

11 Claims, 7 Drawing Sheets

PROGRESSIVE BRAKE LIGHT SYSTEM

CROSS REFERENCE TO RELATED APPLICATION

This application is a continuation-in-part of PCT/GB99/00431 filed Feb. 11, 1999.

BACKGROUND TO THE INVENTION

This invention relates to a progressive brake light system.

The use of a so-called third brake light in motor vehicles has become popular in recent times. The third brake light is typically positioned so as to be more visible to a driver of a following vehicle. However, the use of this third brake light does not alleviate a problem associated with braking in general and that is the problem of a following driver not being able to determine whether the vehicle in front is being braked lightly or being braked under emergency conditions.

SUMMARY OF THE INVENTION

According to the invention a progressive brake light system for a vehicle comprises:

sensor means arranged to sense the degree of application or release of the brakes of the vehicle.

a brake light display arrangement comprising a plurality of individual lights or light units arranged to be illuminated or extinguished in sequence or progressively, in response to the degree of application or release of the brakes, respectively; and a control means for receiving a signal from the sensor means and controlling the sequence of illumination or extinguishment of the lights or light units, the control means including setting means for setting the system in relation to the respective distance the brake pedal for a particular vehicle is arranged to travel and/or the braking profile of the particular vehicle.

The sensor means is preferably an optical sensor arranged to sense the movement or displacement of the brake pedal as it is depressed or released.

The sensor typically comprises two pairs of opposed infrared emitters and receivers arranged respectively to sense the movement of a slotted or apertured wheel or bar passing through the respective infrared beams when the brake pedal is depressed or released.

The brake light display arrangement preferably comprises a single row of lights arranged to light up progressively from each end towards the middle, the greater the application of the brakes the greater the number of lights that is illuminated.

The lights are preferably light emitting diodes (LEDs).

The control means typically comprises a control module or unit comprising a microcontroller and ancillary circuitry arranged to control the logical functions of the system, including the setting means.

In one version of the invention, the system is preferably linked to an existing brake switch, the system being activated only once the brake switch has been triggered.

In an alternative version of the invention, the system includes a brake switch backup mode so as to continue operating the brake light display during brake switch failure.

The brake light display arrangement is preferably configured to illuminate and extinguish in rapid succession when the brakes are applied fully in an emergency braking situation.

An embodiment of the invention is described in detail in the following passages of the specification which refer to the accompanying drawings. The drawings, however, are merely illustrative of how the invention might be put into effect, so that the specific form and arrangement of the features shown is not to be understood as limiting on the invention.

BRIEF DESCRIPTION OF THE ACCOMPANYING DRAWINGS

The invention will now be described in more detail, by way of example only, with reference to the accompanying drawings in which.

DETAILED DESCRIPTION OF INVENTION

The crux of the invention lies in providing a light arrangement which is arranged to illuminate or extinguish in a pre-determined sequence in response to the degree of application of the brakes of a vehicle, and in particular to a control module that is able to "learn" the individual characteristics of the brake pedal for a particular vehicle so as to control the illumination and extinguishing of the light arrangement.

Figure 1:
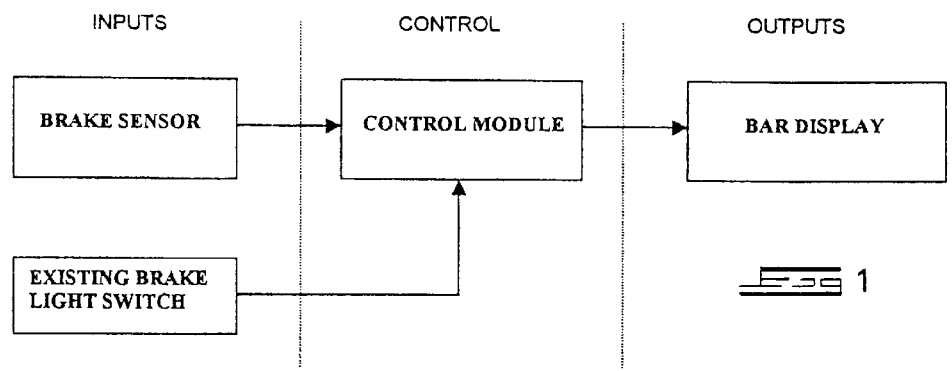
FIG. 1 is a schematic block diagram of a progressive brake light system according to the invention.

Referring to FIG. 1, the essential components of the progressive brake light system of the invention consist of a brake sensor, control module and bar display or brake light display which is arranged to work in conjunction with an existing brake light switch of the vehicle.

Various sensor options such as optical sensors, potentiometer or resistance sensors, speed transducers and accelerometers, strain gauges and linear displacement sensors, for example, can be used. The preferred sensor, however, is an optical sensor of the type commonly used in a PC mouse to control the cursor on a computer screen.

The optical sensor in question consists of two pairs of opposed infrared emitters and receivers arranged to emit and receive respective infrared beams through which a slotted wheel rotates. The slotted wheel is fixed to a spring-loaded hub onto which a cable is attached. In use, the sensor is mounted to a fixed point on the vehicle and the free end of the cable attached to the brake pedal, or vice versa. As the pedal is depressed the cable is wound around the spring-loaded hub causing the hub (and thereby the slotted wheel) to rotate. As the slotted wheel rotates through the respective infrared beams, the number of pulses is recorded which is translated to linear displacement to sense the travel distance of the pedal. The infrared emitters and receivers are arranged in such a way as to provide an approximately 90-degrees offset to enable direction to be determined as well as distance.

The progressive brake light system is linked to the existing brake light switch which is a piece of original equipment that is fitted to standard types of motor vehicles. The switch is used to activate the rear brake lights of a motor vehicle when the brake pedal is depressed. In one version of the invention, only once the existing brake light switch has been triggered will the system become active.

The control module which provides the heart of the system consists of a microcontroller and ancillary circuitry which is arranged to perform all of the logical functions of the system. Thus, the control module will receive a signal from the brake sensor when the brake pedal is either depressed or released and control the illumination of the bar display or progressive lights in accordance with the signal received.

The brake light display arrangement consists of a single row of LEDs (light emitting diodes) which, in use, are fitted to the rear of the vehicle to display the progressive stages of braking.

The brake light display is arranged such that the LEDs are illuminated progressively from the outer ends towards the middle thereof in response to the amount of pressure applied to the brake pedal. Thus, if the brake pedal is only lightly touched, only a few of the outer LEDs will light up. On the other hand, if the brake pedal is depressed fully, such as in an emergency braking situation, all of the lights will light up in sequence from the outside towards the middle.

Although it is not essential that the LEDs illuminate from the ends towards the middle, this is preferred from a practical point of view as the length of the third brake light is immediately discernible when the brake pedal is depressed and the degree of pressure applied to the brake pedal can be gauged by the number of lights being illuminated in relation to the total length of the third brake light. Alternatively, if it is a requirement that the lights are illuminated from the middle, the outer lights may also be illuminated as a reference point.

In a preferred version of the invention, motion of the light illuminating from the outer ends inwards is repeated rapidly in the event of an emergency braking situation with the pedal fully depressed. This not only raises awareness of the light but also distinguishes it from other conventional third brake lights. In addition it will remain in this mode until the brake pedal is completely released so as to retain the warning to approaching cars that an emergency brake was necessary.

Figure 2:
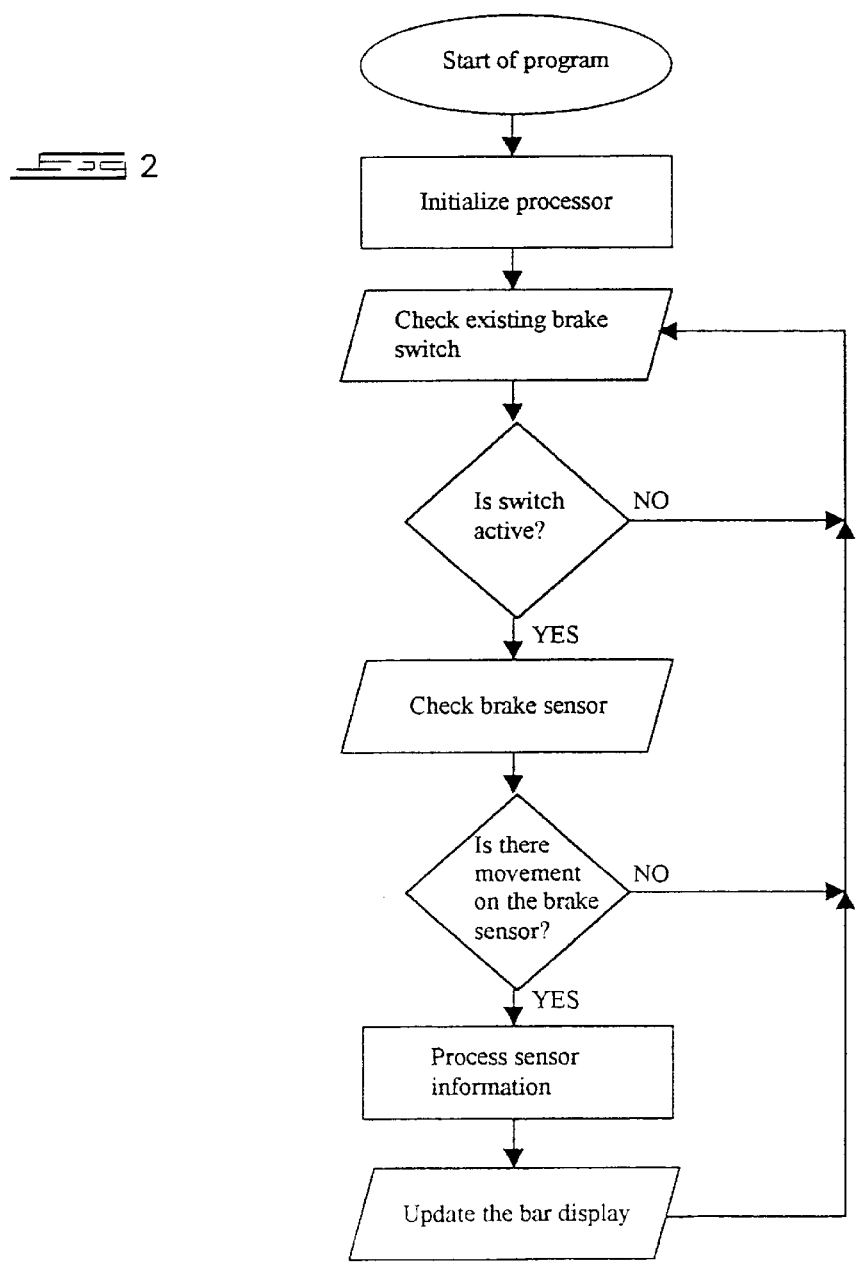
FIG. 2 is a software flow chart for the progressive brake light system of FIG. 1.

Referring to FIG. 2, it can be seen that in this version only once the existing brake light switch has been triggered will the system become active. The system will now check the brake sensor for any movement of the brake pedal. If movement is detected, the control module will either light up or switch off respective lights on the brake light display to indicate whether the brake pedal is being depressed or released and the amount of pressure still applied to the brake pedal. If the brake light switch becomes inactive at any stage, such as when the brake pedal is released completely, the system will deactivate thereby switching off all of the lights of the brake light display.

Although originally envisaged for the aftermarket or retrofit market, in order for the system to be effective in practice, it is preferable that the control module includes setting means in the form of a "learn function" to "learn" the travel distance of the brake pedal of a specific vehicle and/or its braking profile. The 'learn function' offers essential flexibility required to determine the optimal settings/parameters on installation of the system. It also ensures, through continuous monitoring, that these settings remain relevant and accurate through the life of the system, accommodating wear and tear, detecting brake switch failure, and automatically adjusting the stored settings to account for a new brake switch replacing the faulty one. Whilst for the purpose of the present invention the learn function is divided into three broad categories, the desired flexibility of the feature should not be limited to these three categories. In this regard, the three broad categories are the primary learn function, an 'auto-update' learn function, and a 'brake switch backup' learn function.

Figure 3A:
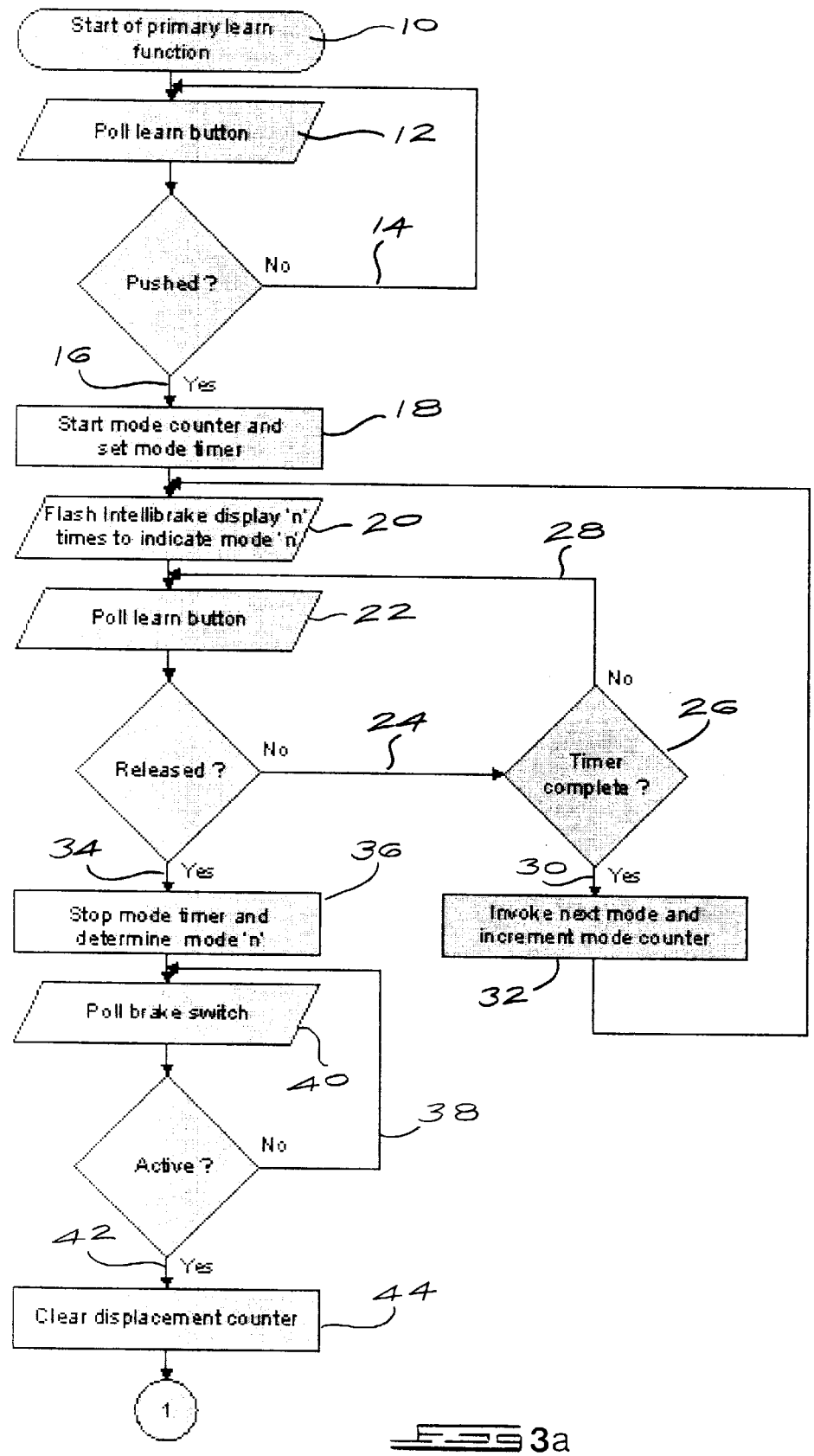
FIGS. 3a and 3b are software flow charts of a primary learn function of the control module of the progressive brake light system of FIG. 1.
Figure 3B:
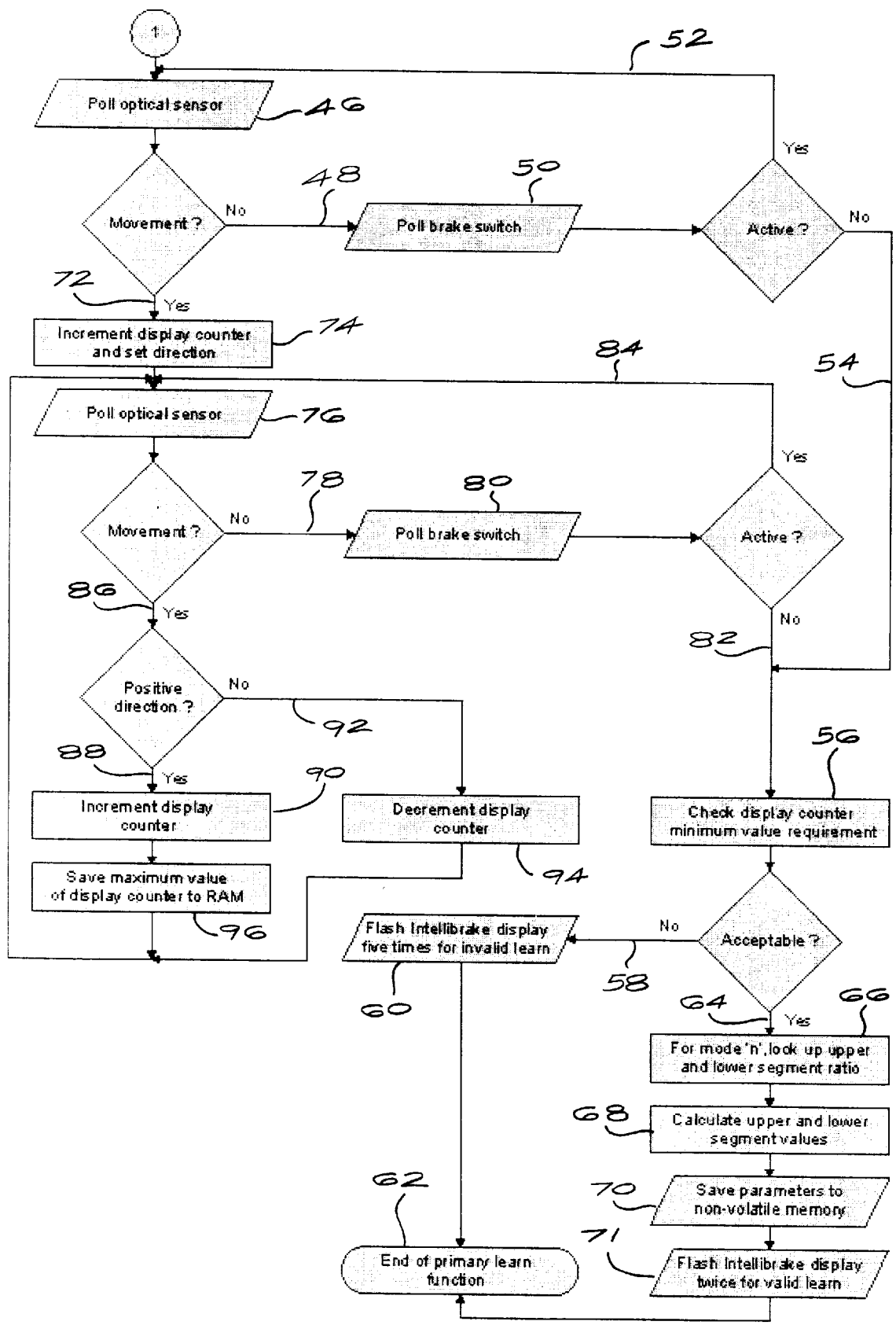

Referring to FIGS. 3a and 3b of the accompanying drawings, the primary learn function is started 10 by pushing the appropriate learn button of the system, which engages the primary learn mode. If, upon polling the learn button 12 the learn function is not engaged 14, this polling is repeated until the learn function button is pushed 16. Once engaged, a mode counter is started and a mode timer set 18. Depending on how long the button is pushed, one of three modes will be engaged 20. The three different modes reflect the different braking effects or braking profiles found on vehicles relative to the brake pedal depression. These are 1) more effective braking at the beginning of the brake pedal depression, followed by less effective braking towards the end: 2) less effective braking at the beginning of the brake pedal depression, followed by more effective braking towards the end; and 3) a linear braking effect in relation to the brake pedal depression.

The system display will flash a certain number of times to indicate which of the modes has been selected. Once the correct mode has been selected, the learn button is released. The system will poll the learn button 22 to determine if the learn button has been released. If not released 24 the system will determine if the mode timer has completed its function 26. If not 28, the system will once again poll the learn button 22. If the timer has completed its function 30, the next mode will be invoked and increment the mode counter accordingly 32. This process will continue until, upon polling the learn button 22, the system detects that the learn button has been released 34. Once the learn button has been released, the mode timer stops and the appropriate mode is determined 36.

In a preferred version of the invention, each mode will have a corresponding formula/ratio for 'allocating' the travel distance input according to the braking pattern inferred from the mode selected. By way of example, if mode 1 is selected, a 35:66 ratio may be invoked which would have the following processing implication: as the pedal travels 35% of the total travel distance, the first 3 (lower segments) out of 6 segments will illuminate, and similarly as the pedal travels the remaining 65%, the last 3 (upper) segments will illuminate. Mode 2 may have a ratio of 65:35 and mode 3 a ratio of 50:50.

Once the mode has been determined, the brake pedal is depressed and the brake switch polled 40. If not active 38, the system continues to poll the brake switch until activity is detected. Once active 42, it then clears a displacement counter 44 and looks for movement of the optical sensor 46. If no movement is detected 48, the brake switch is once again polled 50. If not active 54, check display counter for minimum value required for a valid 'learn' 56. Since there has been no movement from first activation of the brake switch until its release, the value (being zero) will not be acceptable 58, hence the display will flash an appropriate number of times, typically 5 times, to indicate an invalid learn function 60, and end learn function 62. If, however, the brake switch remains active 52, the optical sensor is again polled 46.

Where movement of the optical sensor is detected 72, such movement will determine which direction constitutes a push and hence which direction constitutes a release.

Accordingly, the display counter may be incremented and the direction of movement set 74.

The optical sensor is once again polled 76. If no movement is detected 78, the brake switch is polled 80. If no activity is detected 82, the display counter minimum value requirements are checked 56 and the process continues until the primary learn function is ended 62, as described above. If activity of the brake switch is detected 84, the optical sensor is again polled 76 until movement is detected.

Once movement of the optical sensor is detected 86, the system detects the direction of movement. If positive 88, the display counter is incremented 90. If negative 92, the display counter is decremented 94. Once the pedal is released, the highest positive displacement value is stored in RAM (Random Access Memory) 96. This value is then compared with the minimum value requirement 56, and once again the process continues until the primary learn function is ended 62.

Figure 4A:
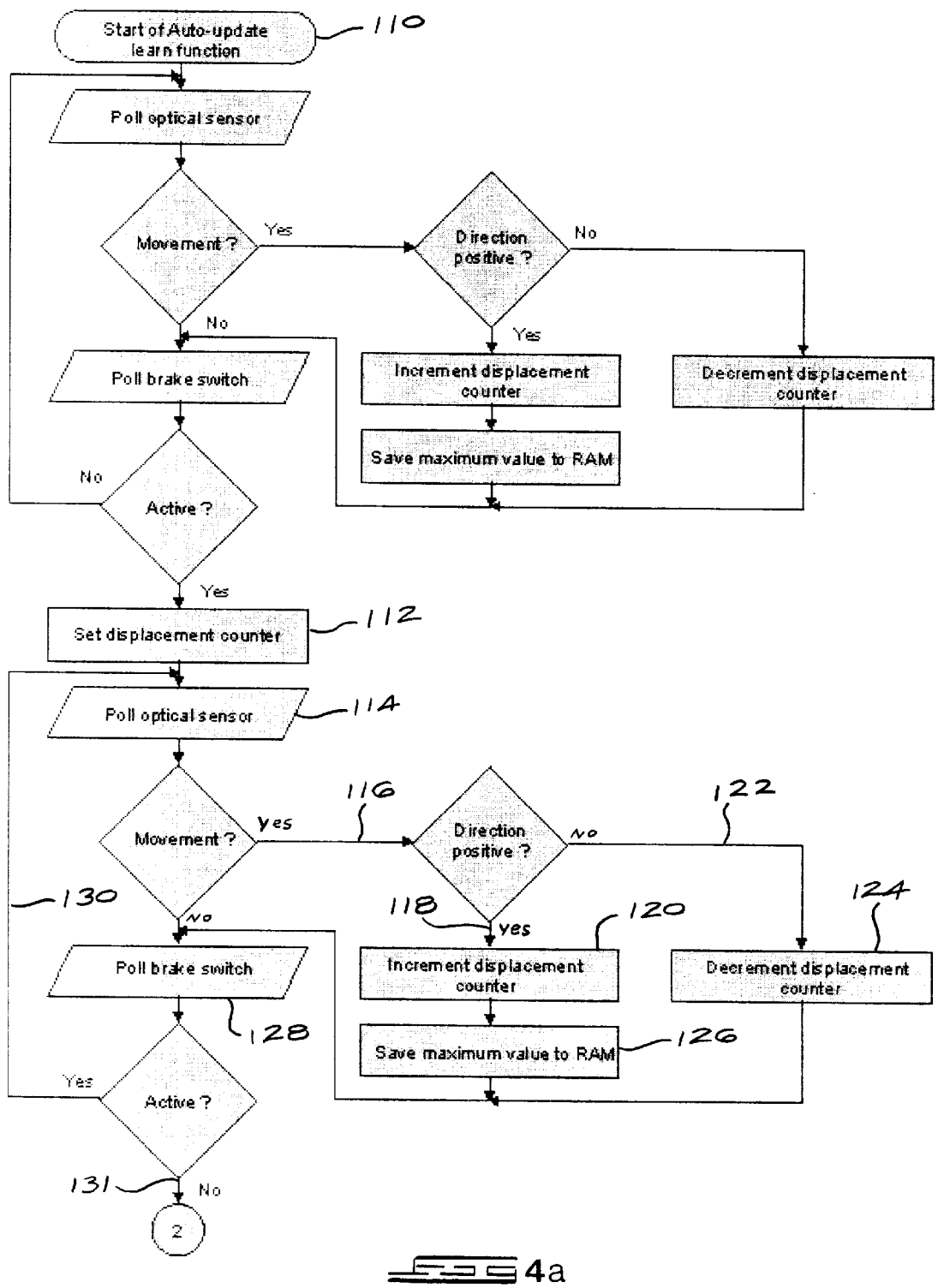
FIGS. 4a and 4b are software flow charts of an auto-update learn function of the control module of the progressive brake light system of FIG. 1.
Figure 4B:
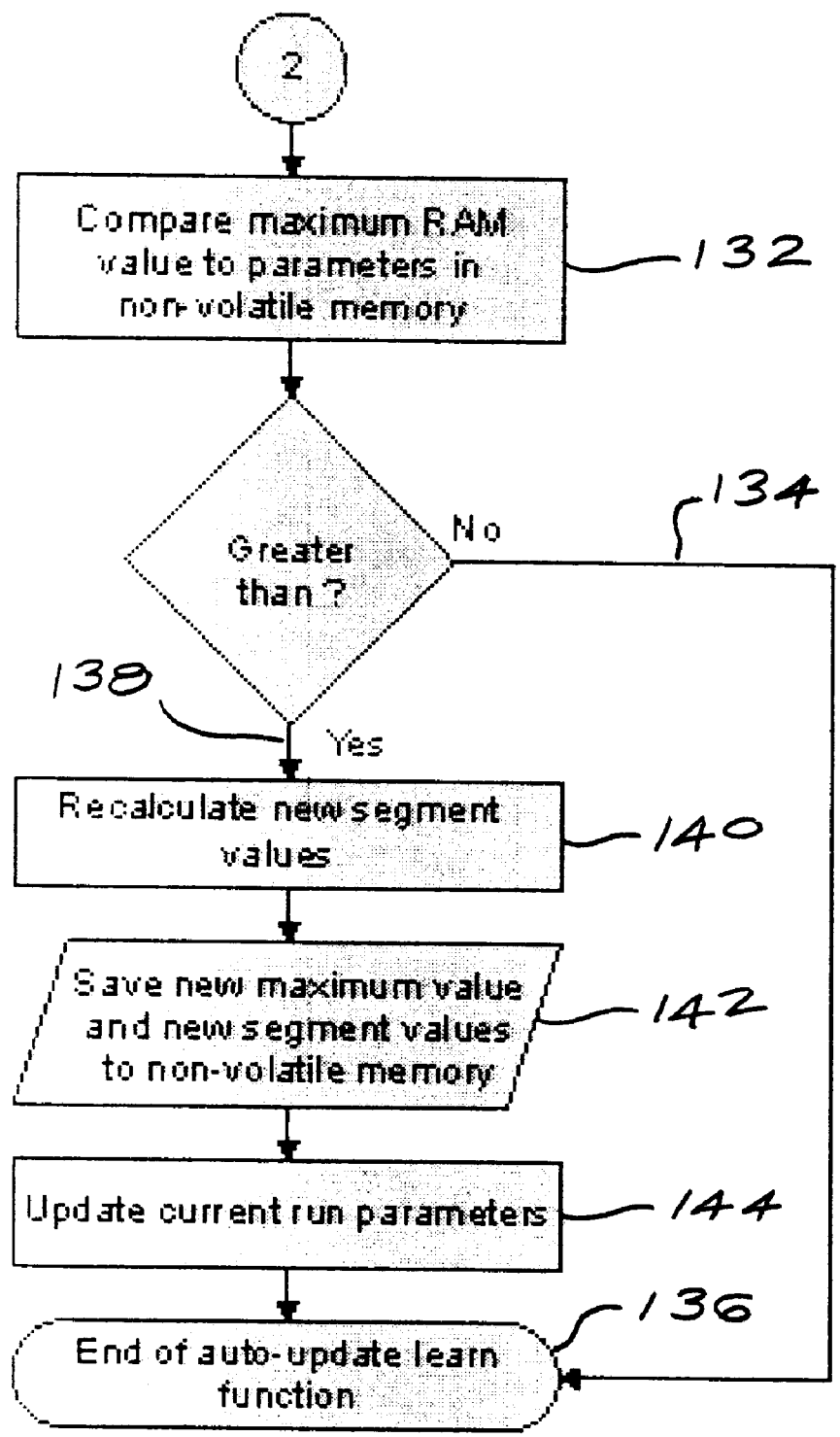

Turning now to FIGS. 4a and 4b, the auto-update learn function 110 is an ongoing learn function designed to detect when the stored maximum travel distance of the brake pedal has been exceeded (due to wear and tear) in which case it updates the non-volatile memory with the greater value.

Once the displacement counter has been set 112, the system monitors the optical sensor for movement 114. When detecting movement 116, it will determine if it is in a positive direction 118, in which case it will increment the displacement counter 120 and likewise when detecting movement in a negative direction 122 it will decrement the display counter 124. The maximum displacement counter value is then saved to RAM 126. The brake switch is then polled 128. If activity of the brake switch is detected 130, the system continues to monitor the brake switch in accordance with the above process steps. If no activity is detected 131, and upon release of the brake pedal, this maximum value in RAM 126 is then compared to the parameters stored in non-volatile memory 132. If the RAM value is less than the non-volatile memory 134, it ends the auto-update learn function 136. If, however, the maximum value stored in RAM exceeds the parameters stored in non-volatile memory 138, then new segment values are calculated 140 based on this greater value. These new values are saved to non-volatile memory 142 and the current run parameters are updated 144, whereupon the auto-update learn function is ended 136.

Figure 5A:
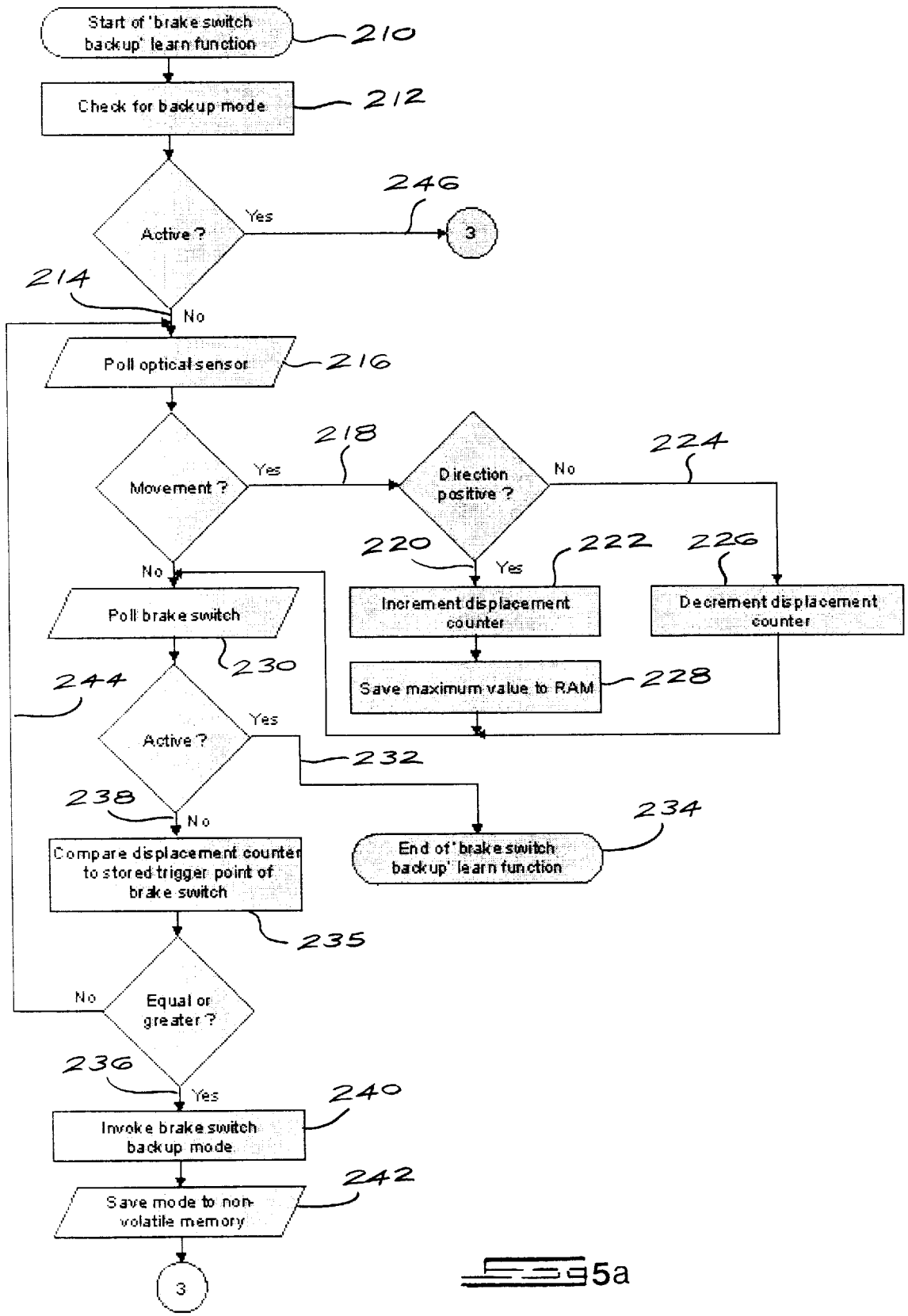
FIGS. 5a and 5b are software flow charts of a brake switch backup learn function of the control module of the progressive brake light system of FIG. 1.
Figure 5B:
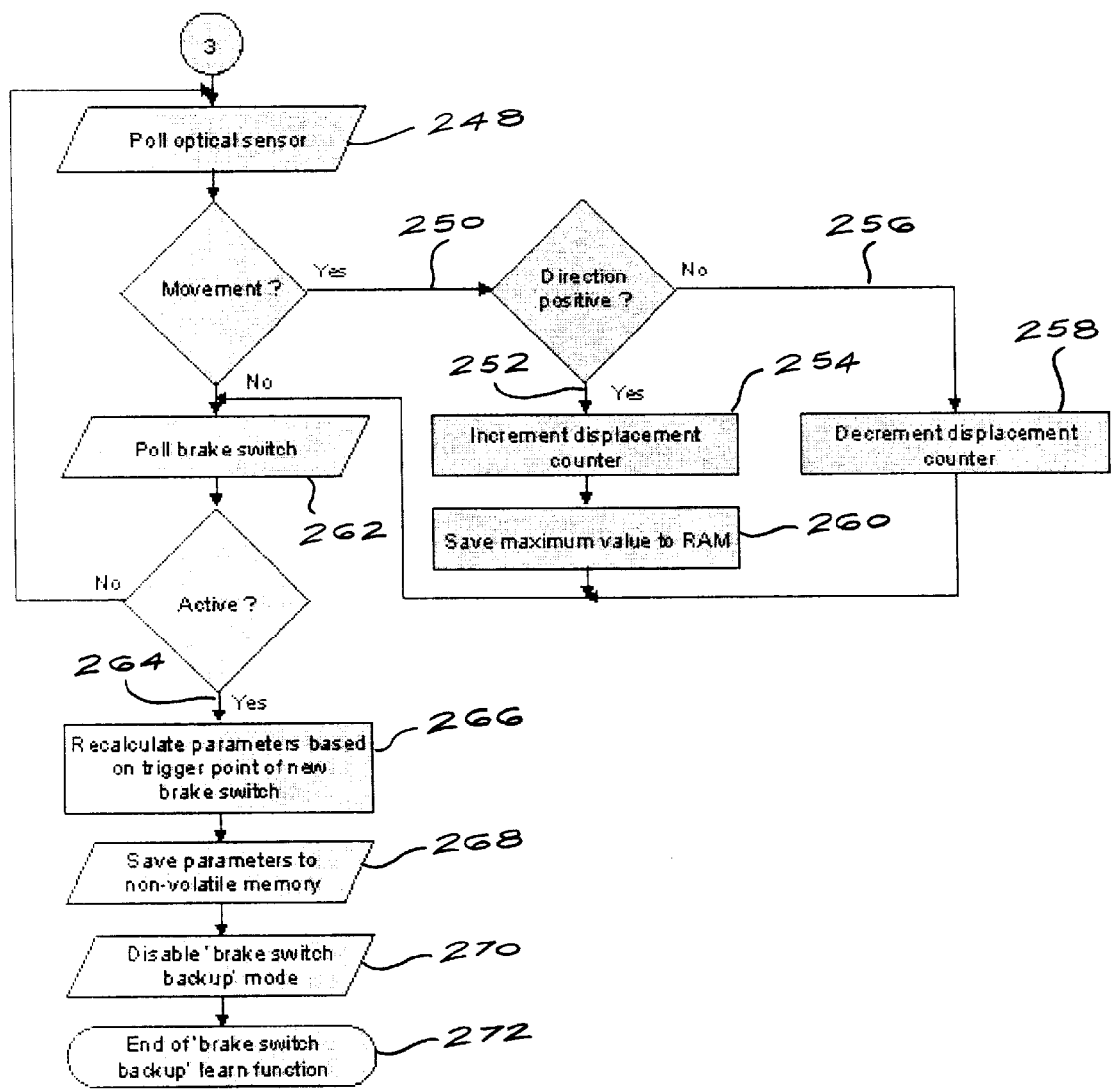

Referring to FIGS. 5a and 5b, the brake switch backup learn function 210 is a learn function designed to provide a backup to the brake switch in the event of a faulty brake switch, which backup mode is continually checked for activity 212.

In normal operation, the backup mode is not active 214. The optical sensor is polled for movement 216. As with normal operation, where movement is detected 218, positive direction 220 would increment the displacement counter 222 and negative direction 224 would cause it to decrement 226.

The maximum value is again stored in RAM 228. As it increments the displacement counter 222 it polls the brake switch 230 to check if it has been triggered. If active 232, it ends the brake switch backup learn function 234. The system continuously compares the displacement counter value to the stored trigger point of the brake switch 235 (stored in non-volatile memory). If it reaches or exceeds the stored trigger point 236 without having received a brake switch signal 238, it will assume that the brake switch is faulty and engage the brake switch backup mode 240, which it will save to non-volatile memory 242. If the stored triggered point is not reached or exceeded 244, it continues the process until or if the stored trigger point is exceeded.

Where the stored trigger point has been exceeded, and the backup mode invoked, it will continue to operate in the backup mode 246. This will involve polling the optical sensor 248 for movement and illuminating the display unit accordingly. Therefore the display will continue to operate when the factory fitted brake lights will not. Where movement of the optical sensor is detected 250, it once again determines direction of movement. Positive direction 252 results in the displacement counter being incremented 254, negative movement 256 results in the displacement counter being decremented 258. The maximum value is again stored in RAM 260. Having polled the optical sensor 248, the system polls the brake switch 262. If it receives a signal from the brake switch 264 it will assume that the faulty brake switch has been replaced. It then recalculates the new parameters based on the trigger point of the new brake switch 266. It then saves these parameters to non-volatile memory 268 and disables the backup mode 270, thereby ending the brake switch backup learn function 272.

Although an optical brake sensor is used in this embodiment, it is to be understood that any other appropriate sensor means can be used to sense the degree of application of the brakes.

Thus, for instance, a speed transducer attached to the speedometer cable on the output drive of the gear box or a direct input into the control module from the speed transducer of a vehicle that does not have a speedometer cable, can be used.

Likewise, a strain gauge can be fitted to the brake pedal to measure strain applied on the brake pedal during braking. Strain gauges can also be fitted to other components that might be acted upon when the brake pedal is moved.

Further, a pressure transducer or sender unit can be fitted onto the master cylinder or brake lines to measure actual braking pressure.

Alternatively, a derivative of the preferred optical sensor can be configured in such a way that the sensor arrangement consists of a bar with apertures or holes defined therein which are arranged to move past the two emitters and receivers as previously discussed.

Finally, resistance type sensors could be used. An example of this would be a potentiometer, which is configured in a similar manner to the optical sensor, but the infrared emitters and receivers are replaced with a potentiometer. A change in the resistance on the potentiometer will thus cause a change in voltage and current which in turn can be detected by the control module, and the data processed accordingly.

Once again, although a control module using a microcontroller is preferred as it is software programmable, a control module without a microcontroller can be used. A microcontroller is, however, preferred as the system can be upgraded by simply upgrading the software, providing greater flexibility.

Referring to the brake light display, it is to be understood that although a linear display arrangement having individual LEDs is preferred, any other appropriate light arrangement can be used provided the lights or light units light up in a sequence or progressively in relation to application of the brakes.

It is believed that the progressive brake light system of the invention provides a number of advantages over existing brake light systems. The brake light indicator not only acts a third brake light, it also provides an indication of the degree of application of the brakes of a vehicle. Accordingly, the driver of a following vehicle is in a better position to determine how hard the brakes of his or her vehicle are to be applied. Further, the brake light system of the invention can be tailored to a particular vehicle and to any changes to its braking profile during the life of the vehicle.

What is claimed is:

1. A progressive brake light system for a vehicle comprising:

sensor means arranged to sense the degree of application or release of the brakes of the vehicle;

a brake light display arrangement comprising a plurality of individual lights or light units arranged to be illuminated or extinguished in sequence or progressively, in response to the degree of application or release of the brakes, respectively;

a control means for receiving a signal from the sensor means and controlling the sequence of illumination or extinguishment of the lights or light units; and setting means for setting the system in relation to the respective distance the brake pedal for a particular vehicle is arranged to travel, wherein when the setting means is activated and a user depresses a brake pedal of the vehicle, the setting moans measures the maximum possible travel distance of the brake pedal, which maximum possible travel distance is used to determine where along the maximum possible travel distance the control means should illuminate or extinguish at least some of the plurality of individual lights or light units so that they are illuminated or extinguished in sequence or progressively, in response to the degree of application or release of the brakes.

2. A system according to claim 1, wherein the sensor means is an optical sensor arranged to sense the movement or displacement of the brake pedal as it is depressed or released.

3. A system according to claim 2, wherein the optical sensor comprises two pairs of opposed infrared emitters and receivers arranged respectively to sense the movement of a slotted or apertured wheel or bar passing through the respective infrared beams when the brake pedal is depressed or released.

4. A system according to claim 1, wherein the brake light display arrangement comprises a single row of lights arranged to light up progressively from each end towards the middle, the greater the application of the brakes the greater the number of lights that is illuminated.

5. A system according to claim 4, wherein the lights are light emitting diodes (LEDs).

6. A system according to claim 1, wherein the control means comprises a control module or unit comprising a microcontroller and ancillary circuitry arranged to control the logical functions of the system, including the setting means.

7. A system according to claim 1, wherein the system is linked to an existing brake light switch, the system being activated only once the brake light switch has been triggered.

8. A system according to claim 1, wherein the system includes a brake switch backup mode so as to continue operating the brake light display during brake switch failure.

9. A system according to claim 1, wherein the brake light display arrangement is configured to illuminate and extinguish in rapid succession when the brakes are applied fully in an emergency braking situation.

10. A system according to claim 1, wherein the brake light display arrangement comprises a single row of lights arranged to light up progressively from the middle towards each end, the greater the application of the brakes the greater the number of lights that is illuminated.

11. A system according to claim 1, wherein the setting means sets the system in relation to the braking profile of the particular vehicle, the braking profile being the amount of braking effect attained as a function of a particular travel distance of the brake pedal.

* * * * *